(12) United States Patent
Jones et al.

(10) Patent No.: US 6,425,407 B2
(45) Date of Patent: Jul. 30, 2002

(54) TOUCH-FREE LOADING SYSTEM FOR AN IN-BAY, AUTOMATIC VEHICLE WASH SYSTEM

(75) Inventors: Allen S. Jones, Bay of Islands (NZ); Mark Cuddeback, Green Bay, WI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/848,918

(22) Filed: May 4, 2001

Related U.S. Application Data
(60) Provisional application No. 60/203,232, filed on May 8, 2000.

(51) Int. Cl.⁷ .................................................. B60S 3/04
(52) U.S. Cl. ................................. 134/57 R; 134/123
(58) Field of Search ........................... 134/45, 56 R, 134/57 R, 123; 15/DIG. 2; 340/942, 943

(56) References Cited

U.S. PATENT DOCUMENTS

| | | | |
|---|---|---|---|
| 3,042,303 A | 7/1962 | Kendall et al. ............... 235/99 |
| 3,596,241 A | * 7/1971 | Migenault ................. 134/45 X |
| 4,587,688 A | 5/1986 | Gougoulas .................... 14/316 |
| 4,718,439 A | 1/1988 | Gorra et al. .................... 134/57 |
| 4,726,388 A | 2/1988 | Swinehart et al. ............. 134/45 |
| 4,794,938 A | 1/1989 | Petit .............................. 134/57 |
| 4,850,379 A | 7/1989 | Petit .............................. 134/18 |
| 4,856,543 A | 8/1989 | Petit .............................. 134/57 |
| 4,920,997 A | 5/1990 | Vetter et al. ................... 134/57 |
| 4,933,016 A | * 6/1990 | Carlson ................. 134/57 R X |
| 4,946,513 A | 8/1990 | Del Prato et al. .............. 134/18 |
| 4,981,523 A | 1/1991 | Larson et al. .................. 134/18 |
| 4,988,042 A | 1/1991 | Del Prato et al. ............ 239/263 |
| 5,033,490 A | 7/1991 | Wade et al. ................. 134/123 |
| 5,040,485 A | * 8/1991 | Bailey et al. ............ 134/123 X |
| 5,173,692 A | 12/1992 | Shapiro et al. .............. 340/943 |
| 5,255,695 A | 10/1993 | Dauney ....................... 134/123 |
| 5,291,906 A | * 3/1994 | White ........................ 134/123 |
| 5,447,574 A | 9/1995 | Inoue ........................... 134/18 |
| 5,528,234 A | 6/1996 | Mani et al. .................. 340/933 |
| 5,886,648 A | 3/1999 | McElroy et al. ............. 340/943 |
| 6,147,625 A | * 11/2000 | Decker .................... 134/123 X |

FOREIGN PATENT DOCUMENTS

| | | | |
|---|---|---|---|
| DE | 297 18 440 | 2/1999 | |
| JP | 151156 | * 8/1985 | ................. 134/123 |
| JP | 72679 | * 3/1996 | |
| JP | 24802 | * 1/1997 | |
| WO | WO 99/61295 | 2/1999 | |

OTHER PUBLICATIONS

Text of the Japanese Abstract JP 11011267, Jan. 19, 1999 (1 page).

* cited by examiner

*Primary Examiner*—Philip R. Coe
(74) *Attorney, Agent, or Firm*—Andrus, Sceales, Starke & Sawall, LLP

(57) ABSTRACT

A vehicle loading system for the wash bay of an automatic vehicle wash system that eliminates the use of a floor-mounted target to capture the front tire of the vehicle to be washed. The vehicle wash system includes a pair of side position sensors that detect and create a side profile of the vehicle as the vehicle enters into the wash bay. The vehicle wash system includes a front sensor array that includes a plurality of through-beam sensors that detect the front bumper of a vehicle and signal the vehicle operator to stop when the front bumper is in the correct position. An overhead sensor contained on the overhead gantry detects the top profile of the vehicle positioned within the open wash bay. A control unit receives the information from the variety of sensors and operates the overhead gantry based upon the detected parameters of the vehicle.

36 Claims, 5 Drawing Sheets

TOUCH-FREE LOADING SYSTEM FOR AN IN-BAY, AUTOMATIC VEHICLE WASH SYSTEM

CROSS-REFERENCE TO RELATED APPLICATION

The present invention is related to and claims priority from U.S. Provisional Application No. 60/203,232 filed on May 8, 2000.

BACKGROUND OF THE INVENTION

The present invention is related to a method and apparatus for properly positioning a vehicle in the wash bay of an automatic vehicle wash system. More specifically, the present invention relates to a vehicle-loading system that utilizes a series of sensors to detect and position a vehicle in the wash bay and thus does not require a floor-mounted target that captures a tire of the vehicle to properly position the vehicle within the wash bay of an in-bay, vehicle wash system.

In current in-bay, vehicle wash systems, the vehicle-loading system includes a floor-mounted "target" that captures the tire of the vehicle to be washed. The floor-mounted target is typically an inclined ramp or raised member on the wash bay floor. In this type of system, the operator of the vehicle being washed must guide the left front tire of his or her vehicle onto the ramp. The floor-mounted target is used to accurately position the vehicle relative to the operating components of the in-bay, vehicle washing system such that the control system for the vehicle wash can operate an overhead spray arch in the correct manner to wash the vehicle.

Floor-mounted target systems can cause new customers a great deal of anxiety, since the customer must align the front tire with the target while at the same time watching instruction signs mounted within the wash bay. Additionally, if the floor-mounted target system is missed initially, it is difficult for the customer to back onto the ramp to move into the correct position.

Floor-mounted target systems also have problems that are associated with the variety of production tires that are available on the market. Since the floor-mounted target captures the front tire of the vehicle being washed, floor-mounted target systems constantly have issues with being able to accommodate the variety of widths and heights of different types of tires. Additionally, many high performance vehicles have low profile tires creating a possibility that expensive, polished rims can be scratched or damaged by the floor mounted target system.

Therefore, it is an object of the present invention to provide an open bay loading system that does not include any type of floor-mounted target to position the vehicle within the wash bay. It is an additional object of the present invention to provide a vehicle-loading system that utilizes a plurality of through-beam sensors and position sensors to accurately determine the position of a vehicle within the open wash bay without any contact with a tire of the vehicle. It is an additional object of the present invention to provide a vehicle-loading system that includes left and right side vehicle position sensors that not only detect the position of the vehicle within the open wash bay, but also determine the side profile of the vehicle as it is driven into the open wash bay.

SUMMARY OF THE INVENTION

The present invention is a vehicle-loading system for positioning a vehicle within an open wash bay of a vehicle wash system. The vehicle-loading system does not include any floor-mounted target device to position the vehicle within the wash bay. Instead, the vehicle-loading system of the invention includes at least a pair of front sensors that each emit a through beam spaced from each other by a distance of approximately 18 inches. As the vehicle drives into the wash bay, a pair of right and left vehicle position sensors sense the side profile of the vehicle and the distance of the vehicle from both the right and left sides of the wash bay.

As the vehicle continues to proceed within the wash bay, electronic instruction signs within the wash bay signal the driver to stop when the front bumper of the vehicle is within a certain acceptable position. If the vehicle travels too far into the wash bay, the instruction signs within the wash bay signal the customer to back up into the acceptable position. The use of the front sensors and the right and left vehicle position sensors allows the control unit of the vehicle wash system to determine the position of the vehicle within the wash bay and modify the operating instructions to the overhead gantry and spray arch based upon the position of the vehicle.

In addition to the front sensors and the left and right vehicle position sensors, the vehicle wash system of the present invention includes a sensor positioned on the overhead gantry to detect the height of the vehicle as the overhead gantry makes an initial pass over the vehicle. The overhead sensor is preferably an ultrasonic sensor. As the gantry makes a pass over the vehicle, the overhead sensor is able to determine the top profile of the vehicle, which can be used to control the operation of the side and top portions of the spray arch. Preferably, the overhead sensor mounted to the gantry, as well as the right and left vehicle position sensors and the front sensors are coupled to a common control unit that is able to determine an accurate profile of the vehicle prior to initiating the wash process. In this manner, the control unit for the vehicle wash system can control operation of the spray arch based on a detailed profile of the vehicle being washed.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

In prior art in-bay, touchless vehicle wash systems, a floor mounted target device receives the left front wheel of the vehicle. In many prior art systems, the target device is an inclined ramp that receives the front tire of the vehicle as the vehicle is driven onto the ramp. The ramp includes side rails that aid in the guiding of the front wheel into the proper position, which may scuff or damage the vehicle tire as the vehicle is being properly positioned.

In addition to the possible scuffing of the vehicle tire, prior art touchless vehicle wash systems require the vehicle operator to line up the front wheel with the floor mounted target while at the same time watching instructions on bay-mounted signage. Thus, the prior art system that includes a floor mounted target device causes a great deal of customer anxiety and is difficult to use. Additionally, if the vehicle is driven too far forward, the front tire of the vehicle drives down the back side of the ramp and the vehicle is unable to reposition itself correctly within the vehicle wash bay.

In prior art vehicle wash systems, an overhead gantry moves along a pair of parallel side rails to wash the vehicle when the vehicle is positioned within the wash bay. The overhead gantry typically includes a spray arch that passes around the outside of the vehicle to apply soap and water to clean the vehicle. However, the overhead gantry is unable to determine the position of the front bumper of the vehicle extending forward from the front wheel.

Figure 1:
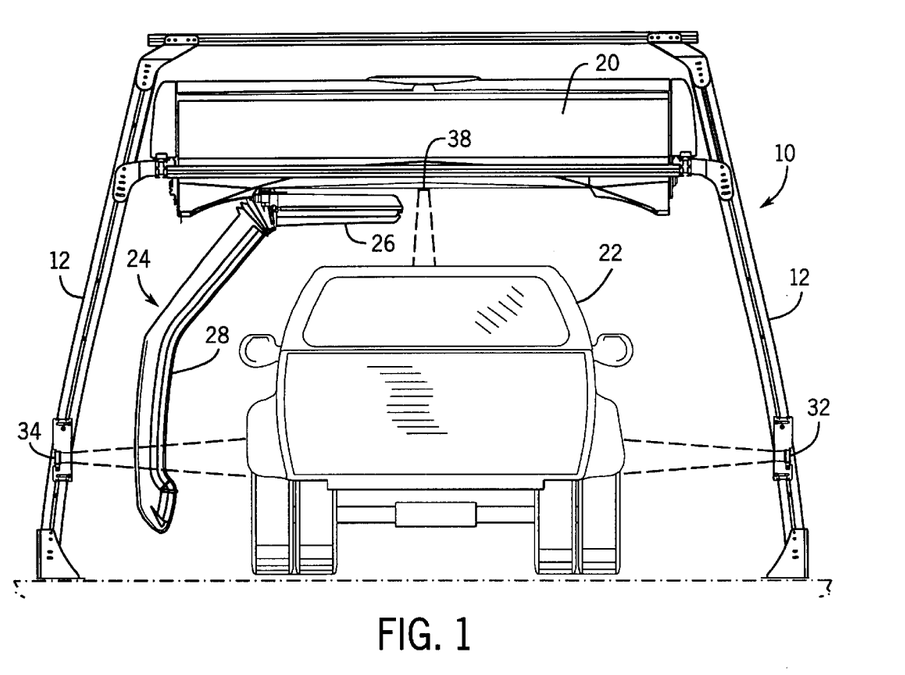
FIG. 1 is an end view of an in-bay touchless vehicle wash system including the vehicle loading and sensing system of the present invention.
Figure 2:
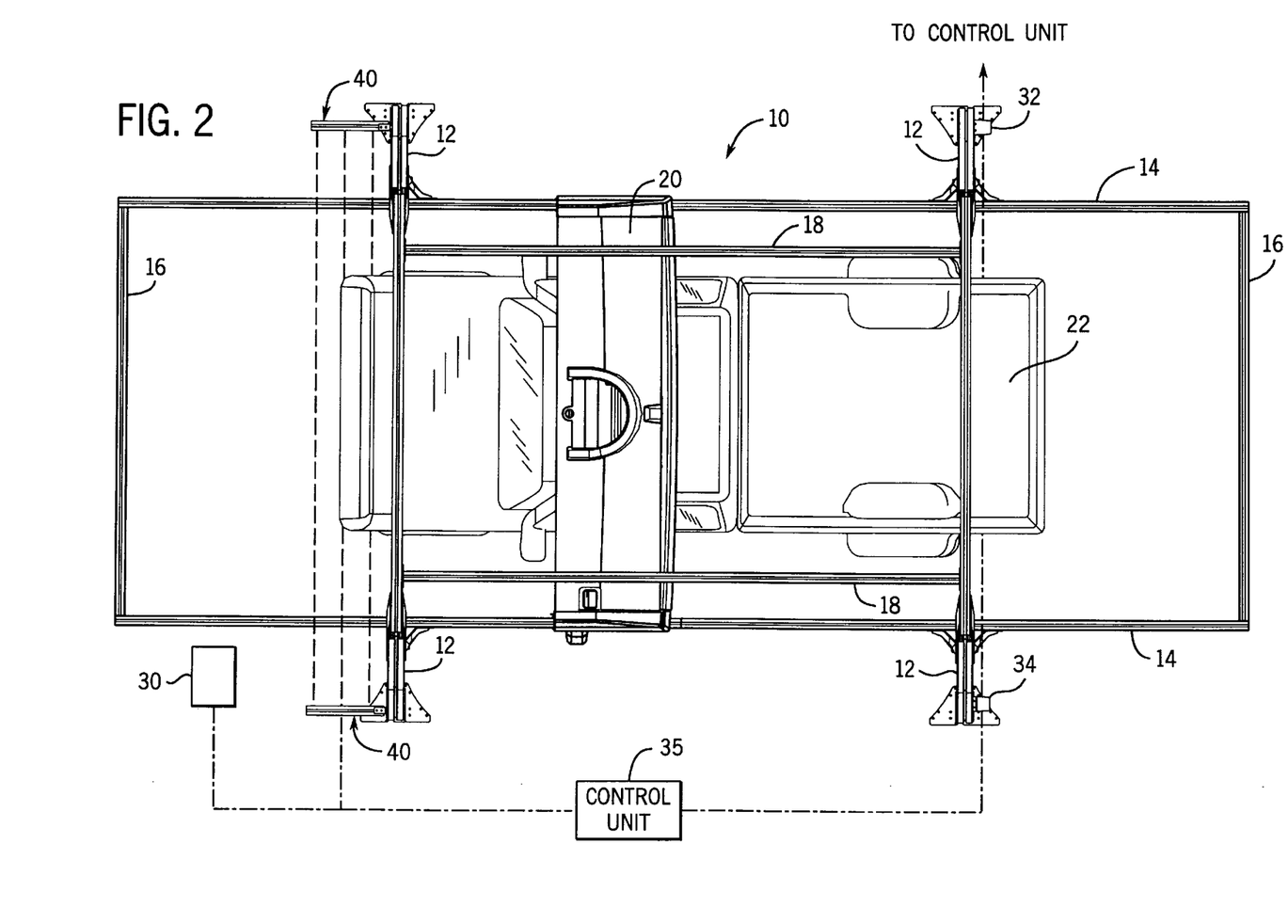
FIG. 2 is a top view of the in-bay, touchless vehicle wash system illustrating the longitudinal positioning of a vehicle within the wash system.

Referring now to FIGS. 1 and 2, there shown is an in-bay, touchless vehicle wash system 10 of the present invention. The vehicle wash system 10 includes four spaced uprights 12 that are connected by a pair of top, side supports 14 that define the longitudinal length of the wash system 10. The side supports 14 are each joined by an end rail 16 to define a top frame for the vehicle wash system.

In addition to supporting the side supports 14, each of the uprights 12 supports a pair of spaced guide rails 18. The spaced guide rails 18 are used to support an overhead gantry 20. The overhead gantry 20 is movable longitudinally along the pair of guide rails 18 to wash the vehicle 22 contained within the open wash bay. As can be understood in FIGS. 1 and 2, the frame for the vehicle wash system 10 is self-supporting and can be positioned within an open wash bay to wash the vehicle 22.

Referring now to FIG. 1, the overhead gantry 20 includes a spray arch 24 that includes a series of spray nozzles used to wash the vehicle 22. The spray arch 24 is rotatable about a central axis and is movable along the length of the gantry 20. Thus, the spray arch 24 is movable across the width of the wash bay. The spray arch 24 includes a top arm 26 and a side arm 28 that each include a series of nozzles used to apply both water and soap to the vehicle 22 during the wash process. As can be seen in FIG. 1, the side arm 28 is angled to generally correspond to the side profile of a vehicle.

Referring now to FIG. 2, the vehicle wash system 10 includes an instruction sign 30 that includes operational instructions for the driver of the vehicle 22 as the vehicle is positioned within the wash bay of the vehicle wash system. Preferably, the instruction sign 30 includes various individual areas that can be lit to provide the vehicle driver the proper instructions, such as to drive forward, drive back, and stop, as well as an indication of when the wash process has been completed.

Referring now to both FIGS. 1 and 2, the vehicle loading system 10 of the present invention includes a right vehicle position sensor 32 and a left vehicle position sensor 34 that are used to detect the vehicle as it enters into the open wash bay between the rear pair of uprights 12. As can be seen in FIG. 1, the right and left vehicle position sensors 32 and 34 are each mounted to one of the rear uprights 12 and are positioned above the floor at a height to detect the side of a vehicle 22 being driven into the open wash bay. The right and left sensors 32 and 34 are positioned near the entry to the wash system such that they detect the entire length of the vehicle, as will be described below. Both the right sensor 32 and the left sensor 34 are coupled to a control unit 35 that controls the operation of the wash system. In the preferred embodiment of the invention, the right vehicle position sensor 32 and the left vehicle position sensor 34 are each an ultrasonic proximity sensor that can determine the distance between the individual sensor and the side of the vehicle.

Figure 3:
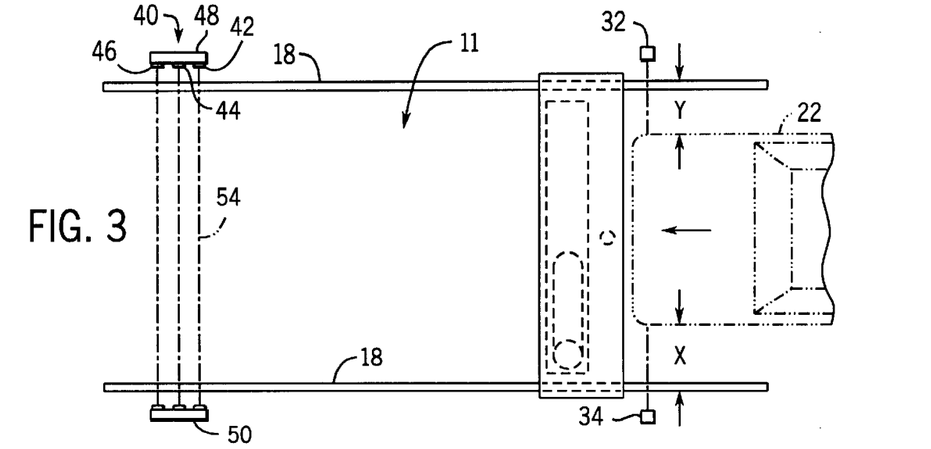
FIG. 3 is a schematic illustration of a vehicle entering the vehicle wash system.
Figure 4:
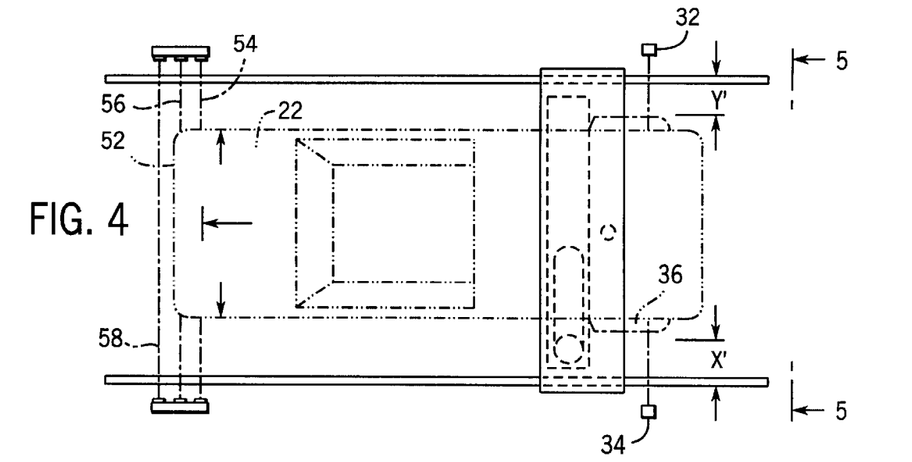
FIG. 4 is a schematic illustration of the movement of the front end of the vehicle and the proper positioning of the vehicle within the vehicle wash system.

Referring now to FIGS. 3 and 4, as the vehicle 22 enters into the open wash bay, the right vehicle position sensor 32 determines the distance between the sensor 32 and the side of the vehicle, as indicated by Y. At the same time, the left vehicle position sensor 34 determines the distance between the sensor 34 and the left side of the vehicle, as indicated by X. As illustrated in FIG. 2, each of the sensors 32 and 34 are connected to the control unit 35 for the vehicle wash system 10. Each of the sensors 32 and 34 determines the distance between itself and either the right or left side of the vehicle at numerous discrete time periods as the vehicle 22 enters into the wash bay. The numerous measurements made by each of the sensors 32 and 34 are used by the control unit 35 to determine the lateral position of the vehicle 22 within the wash bay as well as the side profile of the vehicle. Therefore, the vehicle loading system of the present invention measures and records the full side profiles of the vehicle as the vehicle enters into the wash system.

The vehicle loading system of the present invention allows the control unit 35 of the vehicle wash system to generate a side profile for the vehicle and detect protrusions or contours in the vehicle and adjust the wash operations accordingly. The best example of this type of side sensing is evident in FIG. 4, in which the vehicle 22 includes rear fenders 36 that extend from the otherwise constant side profile of the vehicle. As indicated in FIG. 4, each of the rear bumpers 36 generate a measurement Y' and X' that is different from the initial front measurements X and Y made in FIG. 3. Based upon this information, the control unit used to operate the vehicle wash can control the operation of the spray arch 24 and the overhead gantry based on the position of the vehicle and the side profile.

Referring back to FIG. 1, the overhead gantry 20 includes an overhead sensor 38 that detects the height of the vehicle as the vehicle enters into the wash bay. Specifically, the overhead sensor 38 is an ultrasonic proximity sensor that is connected to the control unit for the vehicle wash system such that the overhead sensor 38 senses the distance between the sensor 38 and the top of the vehicle at discrete time periods as the vehicle enters into the wash bay. Again, the control unit can then determine the top profile of the vehicle prior to initializing the wash process.

In a preferred embodiment of the invention, the control unit 35 can control the operation of the soap and water supplied to both the top arm 26 and the side arm 28 of the spray arch 24 depending upon the top profile sensed by the overhead sensor 38. For example, if the control unit determines from the overhead sensor 38 that the vehicle being washed is a small, compact car, the control unit can turn off operation of the top arm 26 and only emit soap and water from the side arm 28, since the side arm 28 is high enough to adequately cover the entire compact car. Conversely, if the overhead sensor 38 determines that the vehicle is a large truck or sport utility vehicle, the control unit can turn on the soap and water conduits for the top arm 26 to make sure that the roof and hood of the vehicle are adequately covered. In this manner, the vehicle wash system can more efficiently distribute soap and water on vehicles based upon sensing the type of vehicle being washed.

In addition to determining the top profile of the vehicle, the overhead sensor 38 is able to positively determine the position of the back bumper of the vehicle as the overhead gantry 20 initially moves over the vehicle. Thus, the control unit 35 can accurately determine the position of the back of the vehicle, as well as the position of each side prior to beginning the wash process.

Referring now to FIG. 2, the vehicle wash system 10 includes a front sensor array 40 mounted to each of the front uprights 12. The front sensor array 40 includes three individual through-beam sensors that each generate a through beam transmitted across the width of the vehicle wash bay.

Referring now to FIG. 3, the front sensor array 40 includes a first front sensor 42, a second front sensor 44 and a third front sensor 46 that are spaced from each other along a mounting block 48. In the preferred embodiment of the invention, the first, second and third front sensors 42–46 include an emitter contained on the left mounting block 48 and a corresponding receiver contained on the right mounting block 50. Thus, each of the sensors 42–46 generates a through-beam across the width of the vehicle wash bay.

As shown in FIG. 4, when the vehicle enters into the wash bay 11, the front bumper 52 breaks a first through-beam 54 generated by the first front sensor 42. When the first beam 54 is broken, the control unit for the vehicle wash system operates the sign 30 (FIG. 2) to instruct the customer to slow down.

As the vehicle 22 continues to move within the wash bay 11, the front bumper 52 will break a second beam 56 generated by the second front sensor 44. Upon breaking the second beam 56, the control unit operates the sign 30 to instruct the customer to stop. If the customer stops the vehicle before breaking the third beam 58, the sign will indicate to the customer that the vehicle is correctly positioned within the vehicle wash bay.

However, if the vehicle proceeds too far in the vehicle wash bay, the front bumper 52 will break the third beam 58 generated by the third front sensor 46. If the third beam 58 is broken, the control unit will indicate to the consumer that the vehicle has traveled too far within the wash bay and request that the vehicle be backed up until only the first and second beams 54 and 56 are broken. Once the vehicle is correctly positioned, the sign 30 indicates that the vehicle should be placed in park and the wash process will begin.

As can be understood by the foregoing description, the elimination of the "target" device on the floor of the wash bay allows the consumer to easily back up in the wash bay to correctly position the vehicle. In the prior art system which utilized a ramp to position the front end of the vehicle, the reversal of the vehicle direction created problems in the wash process.

As can be understood by the foregoing description, the vehicle loading system of the present invention allows the control unit for the vehicle wash system to accurately locate the front bumper, rear bumper, make a side profile determination for the vehicle, and a top profile determination for the vehicle before the wash process begins. Based on the readings from the individual sensors, the control unit for the vehicle wash system can adjust the operation of the overhead gantry and the spray arch such that the spray arch is correctly positioned relative to the vehicle during the wash operation.

An additional advantage of the present system is that the vehicle is positioned within the wash bay based on the front bumper of the vehicle. By knowing the accurate position of the front bumper, the vehicle wash system can more accurately locate the front of the car to improve cleaning. Current systems that locate the front tire positions have problems associated with the different vehicle dimensions between the front bumper and the front tire.

Figure 5:
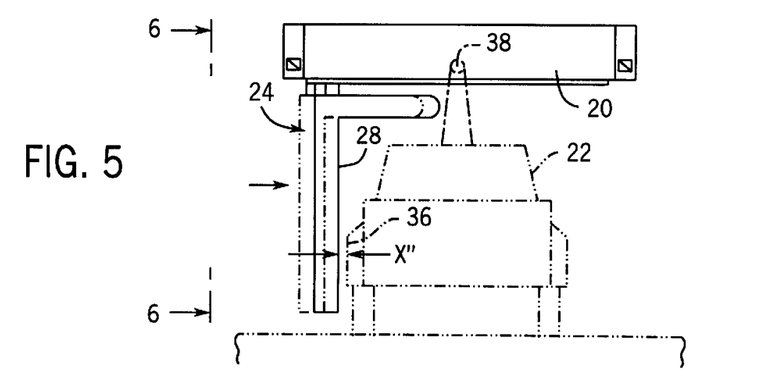
FIG. 5 is an end view illustrating the positioning of a vehicle within the vehicle wash system.

Referring now to FIG. 5, once the vehicle has been positioned within the wash bay, the control unit is able to make a complete and accurate profile of the position of the vehicle as well as a determination of the distance of the vehicle between the right vehicle position sensor 32 and the left vehicle position sensor 34. Based on this determination, the control unit moves the spray arch 24 until the side arm 28 is the desired distance X" from the outermost side portion of the vehicle 22. In the embodiment of the invention illustrated in FIG. 5, the outermost portion is the extended rear bumper 36.

Figure 6:
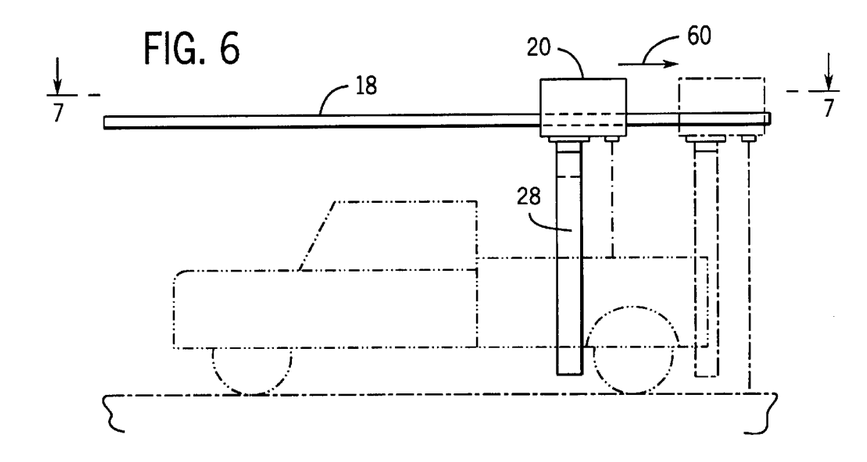
FIG. 6 is a side view taken along line 6—6 of FIG. 5 illustrating the movement of the overhead gantry relative to the vehicle.
Figure 7:
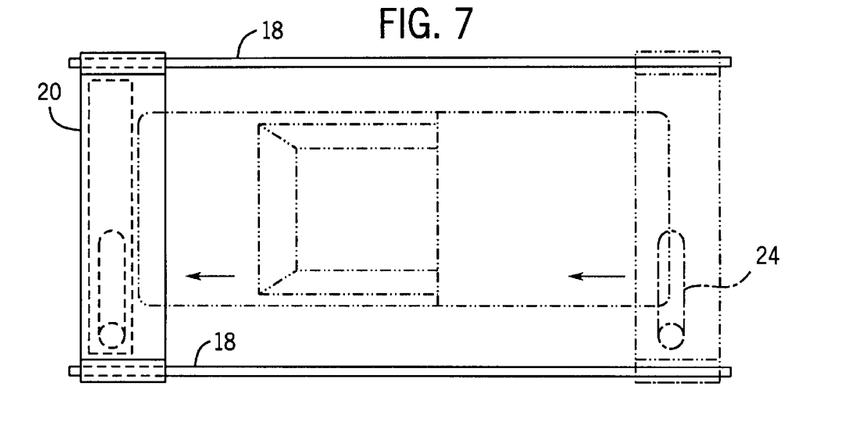
FIG. 7 is a top, schematic illustration of the movement of the overhead gantry during the wash process.
Figure 8:
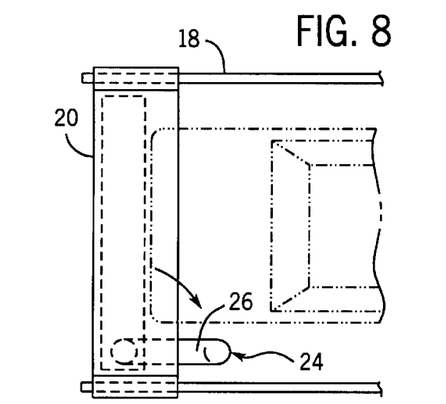
FIG. 8 is a partial schematic illustration of the movement of the spray arch prior to washing the front end of a vehicle.
Figure 9:
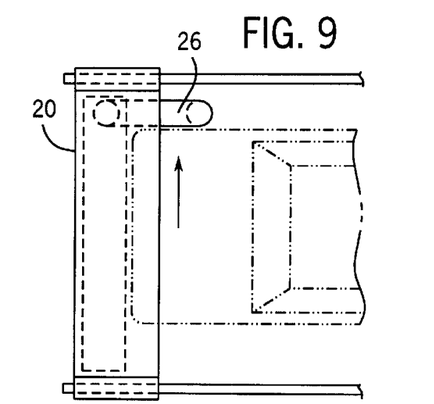
FIG. 9 is a schematic illustration of the movement of the spray arch along the front of a vehicle being washed.

Once the lateral position of the spray arch has been set, the overhead gantry 20 is moved in the direction illustrated by arrow 60 of FIG. 6 to a home position, as illustrated in phantom. As the overhead gantry 20 moves to the home position, the overhead sensor 38 can locate the back bumper of the vehicle. From the home position, the gantry 20 moves along the guide rails 18 such that the spray arch 24 washes the side of the vehicle 22. Once the gantry reaches the end position shown in FIG. 7, the spray arch 24 is rotated 90° and the spray arch is moved laterally across the front of the vehicle, as illustrated in FIGS. 8 and 9.

Figure 10:
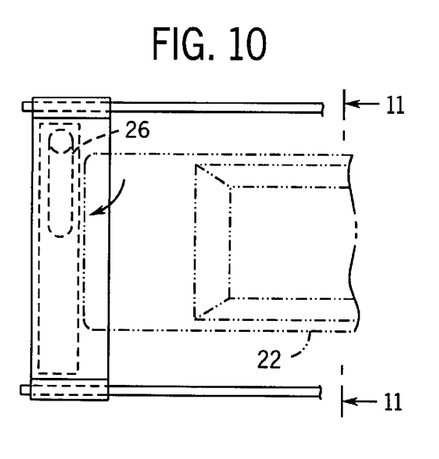
FIG. 10 is a schematic illustration of the movement of the spray arch prior to washing the opposite side of a vehicle.
Figure 11:
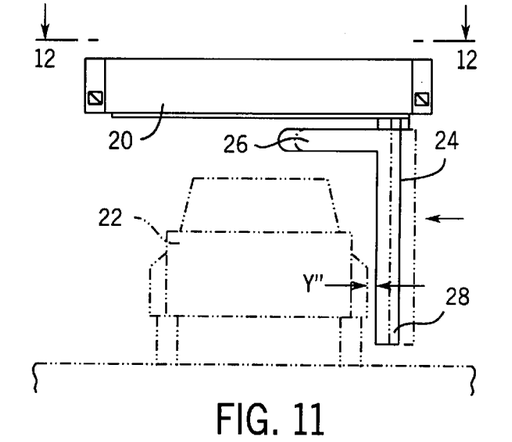
FIG. 11 is a view taken along line 11—11 of FIG. 10.
Figure 12:
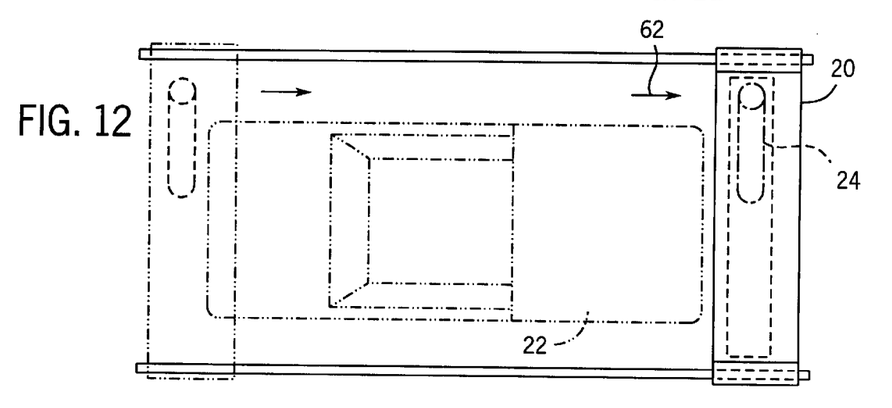
FIG. 12 is a further illustration of the movement of the gantry to wash the opposite side of a vehicle.

Once the spray arch reaches the front right corner of the vehicle, the spray arch again rotates 90 ° into the position shown in FIG. 10. Once in this position, the control unit moves the spray arch 24 until the side arm 28 is the required distance Y" from the outermost side portion of the vehicle 22. Once the spray arch is in the proper position, the gantry 20 moves in the direction illustrated by arrow 62 to its rear position, as illustrated in FIG. 12. During this movement, the spray arch 24 washes the right side of the vehicle.

Figure 13:
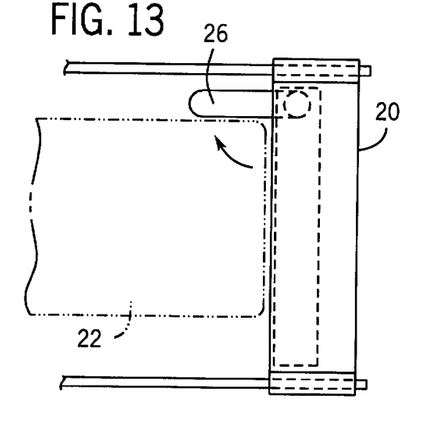
FIG. 13 is a schematic illustration of the movement of the spray arch prior to washing the rear end of a vehicle.
Figure 14:
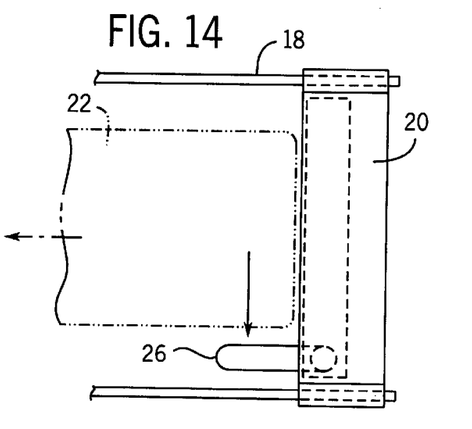
FIG. 14 is a schematic illustration of the movement of the spray arch during washing of the rear end of a vehicle.

Once the gantry 20 reaches its rear position, the spray arch is rotated 90° to the position illustrated in FIG. 13. Once in position, the spray arch is moved laterally across the rear of the vehicle, as illustrated in FIG. 14. In this manner, the spray arch and gantry 20 are able to wash the entire vehicle while it is positioned within the wash bay.

As can be understood by the above description, the vehicle loading system of the present invention is able to accurately position the vehicle within an open wash bay without the use of a "target device", such as a ramp that receives the front tire of a vehicle. The vehicle loading system of the present invention is thus able to more quickly load a vehicle within the open wash bay. This is due to the customer being allowed much more freedom to position themselves within the wash bay, since the system of the present invention can detect the position of the vehicle and adjust the operation of the gantry accordingly. The vehicle positioning system of the present invention has over thirty-two times the parking tolerance of current floor-mounted system, which allows the customer to proceed into the wash bay faster and improves the customer's wash experience.

An additional advantage of the present invention is that the elimination of the floor-mounted "target" alignment system eliminates the large amount of maintenance and installation costs for the vehicle wash machine. Additionally, the elimination of the target system reduces any limitations to the physical size, width, or tire size of the vehicle being washed within the system.

Various alternatives and embodiments are contemplated as being within the scope of the following claims particularly pointing out and distinctly claiming the subject matter regarded as the invention.

We claim:

1. A vehicle wash system for washing a vehicle positioned within a wash bay, the system comprising:
    a movable overhead gantry including a spray arm for washing a vehicle in the wash bay;
    a control unit for controlling the movement of the overhead gantry and the spray arch within the wash bay during the washing of the vehicle;
    a first vehicle position sensor operable to determine the distance from the first vehicle position sensor to a first side of the vehicle as the vehicle enters into the wash bay, the first vehicle position sensor being connected to the control unit; and
    a second vehicle position sensor operable to determine the distance from the second vehicle position sensor to a second side of the vehicle as the vehicle enters into the wash bay, the second vehicle position sensor being connected to the control unit;
    wherein the control unit controls the operation of the overhead gantry and the spray arch based upon the sensed distances of the vehicle from the first vehicle position sensor and the second vehicle position sensor.

2. The system of claim 1 wherein the first vehicle position sensor and the second vehicle position sensor are each ultrasonic proximity sensors.

3. The system of claim 2 wherein the first vehicle position sensor and the second vehicle position sensor determine the distance from the respective sensor to the vehicle at multiple times such that the control unit receives multiple distance measurements from the first and second vehicle position sensors as the vehicle enters into the wash bay.

4. The system of claim 1 further comprising an overhead sensor mounted to the movable overhead gantry, the overhead sensor being operable to determine the distance from the overhead sensor to the top of the vehicle positioned in the wash bay.

5. The system of claim 4 wherein the overhead sensor is an ultrasonic proximity sensor.

6. The system of claim 5 wherein the overhead sensor is connected to the control unit such that the control unit operates the overhead gantry and the spray arch based upon the distance from the overhead sensor to the vehicle.

7. The system of claim 6 wherein the overhead sensor makes multiple measurements during relative movement between the overhead gantry and the vehicle such that the overhead sensor determines the top profile of the vehicle.

8. The system of claim 1 further comprising a front sensor array positioned to detect the front of the vehicle as the vehicle enters into the wash bay, wherein the front sensor array is coupled to the control unit such that the control unit can generate a signal to stop the movement of the vehicle upon sensing the front end of the vehicle by the sensor array.

9. The system of claim 8 wherein the front sensor array includes a first front sensor and a second front sensor each operable to detect the presence of the vehicle, wherein the control unit signals the proper positioning of the vehicle when only the first sensor detects the vehicle and the control unit signals the improper positioning of the vehicle when both the first front sensor and the second front sensor detect the presence of the vehicle.

10. The system of claim 9 wherein both the first front sensor and the second front sensor are through-beam sensors.

11. The system of claim 9 further comprising an electronic sign positioned within the wash bay and coupled to the control unit, wherein the control unit operates the sign to indicate the proper and improper position of the vehicle.

12. A vehicle wash system for washing a vehicle positioned within a wash bay, the system comprising:
    an overhead gantry movable along the length of the vehicle, the overhead gantry including a spray arch for washing the vehicle positioned within the wash bay;
    a front sensor array positioned to detect the front end of the vehicle as the vehicle enters the wash bay wherein the front sensor array includes a first front sensor and a second front sensor each operable to detect the presence of the vehicle; and
    a control unit coupled to the front sensor array to receive an indication of the presence of the vehicle from the front sensor array;
    wherein the control unit generates a signal to direct the position of the vehicle based upon the signal from the front sensor array, wherein the control unit signals the proper positioning of the vehicle when only the first sensor detects the front of the vehicle and the control unit signals the improper positioning of the vehicle when both the first front sensor and the second front sensor detect the presence of the vehicle.

13. The system of claim 12 wherein both the first front sensor and the second front sensor are through-beam sensors.

14. The system of claim 12 further comprising an electronic sign positioned within the wash bay and coupled to the control unit, wherein the control unit operates the sign to indicate the proper and improper positioning of the vehicle within the wash bay.

15. The system of claim 12 further comprising an overhead sensor mounted to the overhead gantry, the overhead sensor being operable to determine the distance from the overhead sensor to the top of the vehicle positioned in the wash bay.

16. The system of claim 15 wherein the overhead sensor is an ultrasonic proximity sensor.

17. The system of claim 16 wherein the overhead sensor makes multiple measurements during relative movement between the overhead gantry and the vehicle such that the overhead sensor generates a top profile of the top surface of the vehicle.

18. The system of claim 17 wherein the overhead sensor is connected to the control unit such that the control unit operates the overhead gantry and the spray arch based upon the detected distance between the overhead sensor and the top of the vehicle.

19. A vehicle wash system for washing a vehicle positioned within a wash bay, the system comprising:
   an overhead gantry movable along the longitudinal length of the vehicle when the vehicle is positioned within the wash bay, the overhead gantry including a spray arch operable to wash the vehicle within the wash bay;
   a control unit for controlling the movement of the overhead gantry and operation of the spray arch during washing of the vehicle;
   a first vehicle position sensor operable to determine the distance from the first vehicle position sensor to a first side of the vehicle as the vehicle enters into the wash bay, the first vehicle position sensor being connected to the control unit;
   a second vehicle position sensor operable to determine the distance from the second vehicle position sensor to a second side of the vehicle as the vehicle enters into the wash bay, the second vehicle position sensor being connected to the control unit;
   an overhead sensor mounted to the overhead gantry, the overhead sensor being operable to determine the distance from the overhead sensor to the top of the vehicle positioned within the wash bay, the overhead sensor being coupled to the control unit; and
   a first front sensor and a second front sensor spaced from each other and connected to the control unit, the first and second front sensors being operable to detect the presence of the vehicle, wherein the control unit signals the proper positioning of the vehicle when only the first front sensor detects the vehicle and the control unit signals the improper positioning of the vehicle when both the first front sensor and the second front sensor detect the presence of the vehicle;
   wherein the control unit controls the operation of the overhead gantry and the operation of the spray arch based upon the sensed distance of the vehicle from the first vehicle position sensor, the sensed distance of the vehicle from the second vehicle position sensor, and the sensed distance of the top of the vehicle from the overhead sensor.

20. The system of claim 19 wherein the first vehicle position sensor and the second vehicle position sensor are ultrasonic proximity sensors.

21. The system of claim 19 wherein the first vehicle position sensor and the second vehicle position sensor make multiple measurements as the vehicle enters the wash bay such that the control unit receives multiple measurements of the distance between the vehicle and the first and second vehicle position sensors such that the control unit can develop a profile of the side surfaces of the vehicle.

22. The system of claim 19 wherein the overhead sensor is an ultrasonic proximity sensor.

23. The system of claim 22 wherein the overhead sensor makes multiple measurements during relative movement between the overhead gantry and the vehicle such that the control unit can determine a top profile of the vehicle.

24. The system of claim 23 wherein the spray arch includes a top arm and a side arm, wherein the control unit controls operation of the top arm and the side arm based upon the top profile of the vehicle.

25. The system of claim 19 wherein the first front sensor and the second front sensor are through-beam sensors.

26. A vehicle wash system for washing a vehicle positioned within a wash bay, the system comprising:
   a movable overhead gantry including a spray arm for washing a vehicle in the wash bay;
   a control unit for controlling the movement of the overhead gantry and the spray arch within the wash bay during the washing of the vehicle;
   a first vehicle position sensor operable to determine the distance from the first vehicle position sensor to a first side of the vehicle, the first vehicle position sensor being connected to the control unit; and
   a second vehicle position sensor operable to determine the distance from the second vehicle position sensor to a second side of the vehicle, the second vehicle position sensor being connected to the control unit,
   wherein the control unit controls the operation of the overhead gantry and the spray arch based upon the sensed distances of the vehicle from the first vehicle position sensor and the second vehicle position sensor.

27. The system of claim 26 wherein the first vehicle position sensor and the second vehicle position sensor are each ultrasonic proximity sensors.

28. The system of claim 27 wherein the first vehicle position sensor and the second vehicle position sensor determine the distance from the respective sensor to the vehicle at multiple times such that the control unit receives multiple distance measurements from the first and second vehicle position sensors as the vehicle enters into the wash bay.

29. The system of claim 26 further comprising an overhead sensor mounted to the movable overhead gantry, the overhead sensor being operable to determine the distance from the overhead sensor to the top of the vehicle positioned in the wash bay.

30. The system of claim 29 wherein the overhead sensor is an ultrasonic proximity sensor.

31. The system of claim 30 wherein the overhead sensor is connected to the control unit such that the control unit operates the overhead gantry and the spray arch based upon the distance from the overhead sensor to the vehicle.

32. The system of claim 31 wherein the overhead sensor makes multiple measurements during relative movement between the overhead gantry and the vehicle such that the overhead sensor determines the top profile of the vehicle.

33. The system of claim 26 further comprising a front sensor array positioned to detect the front of the vehicle as the vehicle enters into the wash bay, wherein the front sensor array is coupled to the control unit such that the control unit can generate a signal to stop the movement of the vehicle upon sensing the front end of the vehicle by the sensor array.

34. The system of claim 33 wherein the front sensor array includes a first front sensor and a second front sensor each operable to detect the presence of the vehicle, wherein the control unit signals the proper positioning of the vehicle when only the first sensor detects the vehicle and the control unit signals the improper positioning of the vehicle when both the first front sensor and the second front sensor detect the presence of the vehicle.

35. The system of claim 34 wherein both the first front sensor and the second front sensor are through-beam sensors.

36. The system of claim 34 further comprising an electronic sign positioned within the wash bay and coupled to the control unit, wherein the control unit operates the sign to indicate the proper and improper position of the vehicle.

* * * * *

(12) INTER PARTES REEXAMINATION CERTIFICATE (0064th)
United States Patent
Jones et al.

(10) Number: US 6,425,407 C1
(45) Certificate Issued: May 5, 2009

(54) TOUCH-FREE LOADING SYSTEM FOR AN IN-BAY AUTOMATIC VEHICLE WASH SYSTEM

(75) Inventors: Allen S. Jones, Bay of Islands (NZ); Mark Cuddeback, Green Bay, WI (US)

(73) Assignee: Delaware Capital Formation, Inc., Wilmington, DE (US)

Reexamination Request:
No. 95/000,053, Sep. 30, 2004
No. 90/007,170, Aug. 12, 2004

Reexamination Certificate for:
Patent No.: 6,425,407
Issued: Jul. 30, 2002
Appl. No.: 09/848,918
Filed: May 4, 2001

Related U.S. Application Data
(60) Provisional application No. 60/203,232, filed on May 8, 2000.

(51) Int. Cl.
*B60S 3/04* (2006.01)

(52) U.S. Cl. ............................ 134/57 R; 134/123
(58) Field of Classification Search .................. None
See application file for complete search history.

(56) References Cited

U.S. PATENT DOCUMENTS

| | | | |
|---|---|---|---|
| 3,042,303 A | 8/1962 | Kendall et al. | |
| 3,167,797 A | 2/1965 | Hergonson | |
| 3,299,901 A | 1/1967 | Axe et al. | |
| 3,421,526 A | 1/1969 | Alkire et al. | |
| 3,422,827 A | 1/1969 | McCulloch | |
| 3,474,801 A | 10/1969 | Stotts | |
| 3,529,611 A | 9/1970 | Daum et al. | |
| 3,533,422 A | 10/1970 | Alimanestiano | |
| 3,543,774 A | 12/1970 | Trasp | |
| 3,596,241 A * | 7/1971 | Mignealt | 340/932.2 |
| 3,604,434 A | 9/1971 | Hurst | |
| 3,736,948 A | 6/1973 | Crosswhite | |
| 3,844,480 A | 10/1974 | Taylor et al. | |
| 4,587,688 A | 5/1986 | Gougoulas | |
| 4,674,069 A | 6/1987 | Mizano | |
| 4,716,916 A | 1/1988 | Hodge | |
| 4,718,439 A | 1/1988 | Gorra et al. | |
| 4,719,932 A | 1/1988 | Burton | |

(Continued)

FOREIGN PATENT DOCUMENTS

| | | |
|---|---|---|
| DE | 297 18 440 | 2/1999 |
| DE | 298 09 426 U1 | 11/1999 |
| DE | 299 03 300 U1 | 4/2000 |
| EP | 0 507 757 B1 | 10/1992 |
| JP | 151156 | 8/1985 |
| JP | 87413 | 3/1994 |
| JP | 72679 | 3/1996 |
| JP | 24802 | 1/1997 |
| JP | 11-11267 | 1/1999 |
| WO | WO 99/61295 | 2/1999 |

OTHER PUBLICATIONS

"Karcher High–Pressure Gantry Vehicle Washes RHP 6000 for Special–Purpose Vehicles, RHP 6300 for Mixed Fleets" Brochure, Alfred Karcher, Inc., May 6, 1990.

(Continued)

*Primary Examiner*—Jeanne M Clark (57) ABSTRACT

A vehicle loading system for the wash bay of an automatic vehicle wash system that eliminates the use of a floor-mounted target to capture the front tire of the vehicle to be washed. The vehicle wash system includes a pair of side position sensors that detect and create a side profile of the vehicle as the vehicle enters into the wash bay. The vehicle wash system includes a front sensor array that includes a plurality of through-beam sensors that detect the front bumper of a vehicle and signal the vehicle operator to stop when the front bumper is in the correct position. An overhead sensor contained on the overhead gantry detects the top profile of the vehicle positioned within the open wash bay. A control unit receives the information from the variety of sensors and operates the overhead gantry based upon the detected parameters of the vehicle.

U.S. PATENT DOCUMENTS

| | | | |
|---|---|---|---|
| 4,726,388 A | | 2/1988 | Swinehart et al. |
| 4,794,938 A | | 1/1989 | Petit |
| 4,850,379 A | | 7/1989 | Petit |
| 4,852,593 A | | 8/1989 | Daugherty |
| 4,856,543 A | | 8/1989 | Petit |
| 4,857,113 A | | 8/1989 | Hodge |
| 4,920,997 A | | 5/1990 | Vetter et al. |
| 4,933,016 A | * | 6/1990 | Carlson ........................ 134/18 |
| 4,946,513 A | | 8/1990 | Del Prato et al. |
| 4,949,423 A | | 8/1990 | Larson et al. |
| 4,981,523 A | | 1/1991 | Larson et al. |
| 4,988,042 A | * | 1/1991 | Del Prato et al. ............ 239/263 |
| 5,033,490 A | | 7/1991 | Wade et al. |
| 5,040,485 A | * | 8/1991 | Bailey et al. ................ 118/680 |
| 5,161,557 A | | 11/1992 | Scheiter, Jr. |
| 5,173,692 A | | 12/1992 | Shapiro et al. |
| 5,226,436 A | | 7/1993 | Kirby |
| 5,255,695 A | | 10/1993 | Downey |
| 5,291,906 A | * | 3/1994 | White ........................ 134/123 |
| 5,447,574 A | | 9/1995 | Inoue |
| 5,482,212 A | | 1/1996 | Kobryn et al. |
| 5,528,234 A | | 6/1996 | Mani et al. |
| 5,725,003 A | | 3/1998 | Jaakkonen |
| 5,886,648 A | | 3/1999 | McElroy et al. |
| 6,147,625 A | | 11/2000 | Decker |
| 6,277,207 B1 | | 8/2001 | Gauthier |
| 6,425,407 B2 | | 7/2002 | Jones et al. |
| 6,458,215 B1 | | 10/2002 | Hatinen et al. |
| 6,551,415 B2 | | 4/2003 | Jones et al. |
| 6,661,516 B1 | | 12/2003 | Dietsch et al. |
| 6,769,440 B2 | | 8/2004 | Jones et al. |

OTHER PUBLICATIONS

"Karcher High–Pressure Gantry Car Wash CHP 7000" Brochure, Alfred Karcher, Inc., Mar. 5, 1996.
"Karcher Gantry Car Wash CWH 4000" Brochure, Alfred Karcher, Inc., May 8, 1996.
"Karcher CWP 8000 Gantry Car Wash" Brochure, Alfred Karcher, Inc., May 8, 1996.
"Gantry Vehicle Washes RBE 6000/RBG 6000" Brochure, Afred Karcher GmbH & Co., Nov. 2000.
"Oceanic" Brochure No. COD. 771897, Ceccato S.p.A., Mar. 1996.
"Istobal Operating and Maintenance Guide for M–12 Rollovers," Istobal, SA, Mar. 1996, p. 5.
"Puentes de lavado M–4, M–7, M–12, M–14, M–15, M–17 Wash roll–over," Istobal, S.A., 1999.
"K1 indienst Euro–Combi" Brochure, Kleindienst GmbH, Mar. 11, 1986.
"Autowaschanlagen Car Wash Systems Lavage d'automobiles" Brochure, California Kleindienst, Feb. 1998.
"California Kleindienst Product Assortment" Brochure, California Kleindienst, Feb. 1998.
"The CK 45 HP–Touchless rollover car wash" Brochure, California Kleindienst, Jan. 8, 1997.
"Gantry System CK 30, the slimline model from our car wash range" Brochure, California Kleindienst, 1998.
"LGFUZZY–EX" Brochure, LG Industrial Systems, Dec. 1996, pp 5, 7 and 11.
"Monarch II" Brochure, Ryko Manufacturing Company, No. 18484–002, Mar. 1994.
"Wesumat Softwash" Brochure Wesumat Car Wash Equipment Ltd., Nov. 1987.

"Wir Bieten Lösungen," Wesumat Fahrzeugwaschanlagen GmbH.
"Wesumat Softwash, Roll–over Car Wash System," Wesumat Fahrzeugwaschanlagen GmbH, Production Information Apr. 1998.
"Select–A–Wash" Brochure, Ryko Mfg. Co.
"Monarch II–Hi Impact" Brochure, Ryko Mfg. Co.
"Atlantis" Touch–Free large Vehicle Wash System brochure, Ryko Mfg. Co., Mar. 2000.
"Adjustable Automatics" Brochure, Oasis Car Wash Systems.
"Adjust–O–Matic 8520" Brochure, Oasis Car Wash Systems.
"Adjust–O–Matic 8700" Brochure, Oasis Car Wash Systems.
"Carlson RW" brochure, Clean Concepts.
"Autostar Rollover" brochure, Hanna–Sherman International, Inc.
Ultrasonics [Asonic01] vol. A, User's Manual, Ultrasonics, Dec. 1996.
"Clean Concepts" Brochure, Carlson Maxi–Wash.
"Velvet Touch 2000" Brochure #20335–000, Ryko, Aug. 1999.
"SoftGloss XS" Brochure #20335–004, Ryko, Aug. 1997.
Atlantis Truck Wash Owner's Manual, Ryko, p. 28.
"Karcher, CHH 6000 and CHH 8000 Car Washes" Brochure, Alfred Karcher GmbH, Apr. 2000.
"Karcher, CHH 8000 Opti Car Wash, Brilliant Cars With High Pressure, Opti Wash" Brochure, Alfred Karcher GmbH, Aug. 2000.
"Karcher, Systematic Modular Construction for More Flexibility and Economy Car Wash CWS, CWS 4000 and CWS 6000" Brochure, Alfred Karcher GmbH, Aug. 2000.
"Karcher Car Wash CWP 8000" Brochure, Alfred Karcher, Inc., Nov. 11, 1999.
"Autowascentrum Rijkerswoerd" Brochure, Baptista, undated.
"Baptista Al Vijftig Jaar Groot In Reinigingssystemen," Brochure, Baptista Autowassystemen, undated.
"Baptista Soft Touch" Brochure, Baptista Autowassystemen, undated.
"Borstel–Autowashmachine type Combi–2000," Baptista, undated.
"Borstel–Autowashmachine type Single–Combi" Brochure, Baptista, undated.
"Vector Rapid Wash" Brochure, Belanger, Inc., Apr. 2000.
"Advant The Latest Rollover Gantry Wash and Dry System," Brochure, Ceccato S.p.A., undated.
"Challenge" Brochure, Ceccato S.p.A., undated.
"Carlson 2000 The Solution" Brochure, Clean Concepts, undated.
"D&S Manufacturing 5000" Brochure, D&S Manufacturing, undated.
"Ferrum Custom–made Multiprogramme Wash for Heavy Goods Vehicles" Brochure, Ferrum, undated.
"Ferrum Star Multiprogramme," Ferrum, undated.
"Niagara Drive–Thru Automatic Vehicle Washing Systems" Brochure, Niagara National Corporation, undated.
"Niagara Deluxe Heavy Duty Gantry Vehicle Washing System" Brochure, Niagara National Corporation, undated.
"Niagara National Corp." Brochure, Niagara National Corporation, undated.
"Niagara Powerwash Systems, Inc." Brochure, Niagara Powerwash Systems, Inc., undated.

"Impianti di lavaggio industriali industrial washing plants" Brochure, O.M.Z. s.r.l.
"Adjust–O–Matic 9100," Brochure, Oasis Car Wash Systems, undated.
"Oasis Car Wash Systems, Storm," Oasis Car Wash Systems, Inc., undated.
"Christ Christall 1+1. The Twin System." Brochure, Otto Christ GmbH Carwash Equipment, undated.
"Christ, Christ Primus. Die Portalwaschanlage." Brochure, Otto Christ, AG undated.
"Christ Primus 1+1. Die Doppelanlage." Brochure, Otto Christ AG, undated.
"Truck & Bus Wash Unit, Christ" Brochure, Otto Christ GmbH & Co., undated.
"Elite High Impact" Brochure, Ryko Manufacturing Company, undated.
"Scan Wash High–Pressure Roll–Over Car Wash" Brochure, SSI Corp., undated.
Print–out http://www.southernpride-snm.com/, Southern Pride Car Wash Systems, printed Apr. 2, 2003.
"Bruksanvisning SC95 Scanwash," WashTec AG, Status Jan. 23, 2001.
"Report on the Period from Jan. 1 to Sep. 30, 2000," WashTec AG.
"Einige Zusatzplane die in Schwedischen Scanwash Vorkommen (SC95)," Wesumat, various dates.
Operating Instructions W92 Softwash, Wesumat Fahrzeugwaschanlagen GmbH, Status at Feb. 24, 2000.
Operating Manual SC95–Scanwash, Wesumat, Stand: May 8, 1996.
"SoftWash High Speed, Rollover Vehicle–Wash System" Brochure, Wesumat AG, Copyright 2001.
"Softwash Roll–over Car Wash Systems" Brochure, Wesumat Fahrzeugwaschanlagen GmbH, undated.
"Wesumat Scan Wash" Brochure, Wesumat Fahrzeugwaschanlagen GmbH, undated.
"Simple Satisfaction" by PDQ Manufacturing, Inc., Copyright 1989.
Text of the Japanese Abstract JP 11011267, Jan. 19, 1999 (1 page).
Text of the Japanese Abstract JP 60151156, Aug. 8, 1985 (1 page).
Text of the Japanese Abstract JP 408072679, Mar. 19, 1996.
Text of the Japanese Abstract JP 409024802, Jan. 28, 1997.
File History for U.S. Patent 6,425,407.
File History for U.S. Patent 6,551,415.
File History for U.S. Patent 6,769,440.
File History for U.S. Appl. No. 10/137,883.
File History for U.S. Appl. No. 60/203,232.
Ingebrigtsen Patent Claim Chart.
Aug. 1994, "Scan Wash Hochdruck–Portalwaschanlage" brochure, Wesumat Fahrzeugwaschanlagan GmbH (German language with English translation).
Aug. 1994, "Scan Wash Estaciones lavacoches de portal a alta presion" brochure, Wesumat Fahrzeugwaschanlagen GmbH (Spanish language with English translation).
Scan Wash Claim Chart.
Atlantis Automatic Truck Wash System Owner's Manual Work Order # 1517240, Ryko Manufacturing Co.
Dec. 10, 1998, Ryko Sales Invoice 821418.
Atlantis Automatic Truck Wash System Installation Manual, Work Order # 1517240, Ryko Manufacturing Co.
Atlantis Automatic Truck Wash System Service Manual Work Order # 1517240, Ryko Manufacturing Co.
Aug. 27, 1997, Ultrasonic Retrokit Installation Retrokit/Atlantis, engineering drawings, Ryko Manufacturing Co.
Feb. 19, 1998, Ryko Sales Invoice.
Jun. 1994, "Monarch II High Impact" brochure, Ryko Manufacturing Co.
Monarch II High Impact Owner's Manual, Work Order # 1805160, Ryko Manufacturing Co.
Apr. 14, 1999, Ryko Sales Invoice 861539.
Monarch II High Impact Installaton Manual, Work Order # 1805160, Ryko Manufacturing Co.
Monarch II High Impact Service Manual, Work Order # 1805160, Ryko Manufacturing Co.
Aug. 1991, Voyager brochure, Ryko Manufacturing Co.
Declaration of James Nelson.
Atlantis Claim Chart.
1996, "The Ultimate Frictionless In–Bay Automatic Vehicle Wash" Laser Wash 4000 brochure, PDQ Manufacturing, Inc.
1998, "Laserwash 4000 The Ultimate Frictionless In–Bay Automatic Vehicle Wash" brochure, PDQ Manufacturing Inc.
Laser Wash 4000 brochure "Laser Wash 4000 from PDQ Manufacturing".
1995, 1996, Laser Wash 4000 Fact Sheets.
1998, "Get Away More Often" Laser Wash 4000 Advertisement, PDQ Manufacturing Inc.
Nov. 1998, Laser Wash 4000 Pre–Installation Manual, Section M800026, PDQ Manufacturing, Inc.
Apr. 1998, Laser Wash 4000 Troubleshooting Manual, M800021, PDQ Manufacturing, Inc.
Dec. 1997, Laser Wash 4000 Speed Controller Manual, M800027, PDQ Manufacturing, Inc.
Mar. 1998, Laser Wash 4000 Start–Up Manual, M800018, PDQ Manufacturing, Inc.
Feb. 1998, Laser Wash 4000 Lasermind Controller Programming Manual Version 16 Software Series 2379, Section M800219, PDQ Manufacturing, Inc.
1999, "Puentes de lavado M–4, M–7, M–12, M–14, M–15, M–17, Wash roll–over" brochure, Istobal, S.A.
1996, Istobal M–12 Operating and Maintenance Guide for M–12 Rollovers, Istobal, S.A.
Nov. 14, 1995, Istobal Electrical Layouts and Components Roll–Over M–11, M–12, Istobal, S.A.
Declaration of Karl Reid and Exhibits.
Sep. 23, 2004, Declaration of Jerrold A. Senske and Exhibits.
Jan. 10, 1989, Baptista letter and brochures.
1997, "Gebruikershandeleiding Baptista Borstelautowasmachine" Manual, Baptista.
Jan. 1986, Kleindienst Operating and Maintenance Manual Euro–Combi Type 6–683 USA, Kliendienst GmbH.
Mar. 1996, "Oceanic" brochure, Ceccato S.p.A.
"UltraSonic 2001" Brochure #20335–024, Ryko, Feb. 1999.
"Velvet Touch 2000" Brochure #203355–000, Ryko, Aug. 1999.
"Baptista Al Vijftig Jaar Groot in Reinigingssystemen," Brochure, Baptista Autowassystemen, undated.
"Vector Rapid Wash" Brochure, Belanger, Inc., Apr. 2000.
Jul. 1998, "Challenge" Brochure, Ceccato S.p.A.
"Niagara Drive–Thru Automatic Vehicle Washing Systems" Brochure, Niagara National Corporation, undated.
"Scan Wash High–Pressure Roll–Over Car Wash"Brochure, SSI Corp., undated.
"Bruksanvisning SC95 Scanwash," WashTec AG, Status Jan. 23, 2001.

"Report on the Period From Jan. 1 to Sep. 30, 2000," Wash-Tec AG.

May 1996, "Atlantis Touch–Free Large Vehicle Wash System" brochure, Ryko Manufacturing Co.

Apr. 1986, "New: Kleindienst Euro–Combi" brochure, Kleindienst GmbH.

Text of the Japanese Abstract JP 409024802, Jan. 28, 1997.

Aug. 12, 2004, Request for exparte reexamination of U.S. Patent No. 6,425,407.

May 6, 1990, "Karcher High–Pressure Gantry Vehicle Washes RHP 6000 for Special–Purpose Vehicles, RHP 6300 for Mixed Fleets" brochure, Alfred Karcher, Inc.

Mar. 5, 1996, "Karcher High–Pressure Gantry Car Wash CHP 7000" brochure, Alfred Karcher, Inc.

May 8, 1996, "Karcher Gantry Car Wash CWH 4000" brochure, Alfred Karcher, Inc.

May 8, 1996, "Karcher CWP 8000 Gantry Car Wash" brochure, Alfred Karcher, Inc.

Nov. 1, 2000, "Gantry Vehicle Washes RBE 6000 / RBG 6000" brochure, Alfred Karcher GmbH & Co.

Feb. 1, 1998, "Autowaschanlagan Car Wash Systems Lavage d'automobiles" brochure, California Kleindienst.

Feb. 1, 1998, "California Kleindienst Product Assortment" brochure, California Kleindienst.

Jan. 8, 1997, "The CK 45 HP–Touchless rollover car was" brochure, California Kleindienst.

Jan. 1, 1998, "Gantry System CK 30, the slimline model from our car wash range" brochure, California Kleindienst.

Dec. 1, 1996, "LG FUZZY–EX" brochure, LG Industrial Systems, pp. 5, 7 and 11.

Mar. 1, 1994, "Monarch II" brochure, Ryko Manufacturing Company, No. 18484–002.

Nov. 1, 1987, "Wesumat Softwash" brochure Wesumat Car Wash Equipment Ltd.

"Wir Bieten Losungen" Wesumat Fahrzeugwaschanlagen GmbH.

"Select–A–Wash Vehicle Wash System" Ryko Mfg. Co. Service Manual.

Mar. 29, 2004, Text of the Japanese Abstract 6–87413.

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–36 are cancelled.

* * * * *